June 24, 1947.  W. P. MASON  2,422,691
PRISMATIC RADIATING NAVIGATIONAL SYSTEM
Original Filed March 1, 1941  3 Sheets-Sheet 1

INVENTOR
W. P. MASON
BY
H. O. Wright
ATTORNEY

June 24, 1947.                W. P. MASON                2,422,691
               PRISMATIC RADIATING NAVIGATIONAL SYSTEM
                    Original Filed March 1, 1941    3 Sheets-Sheet 2
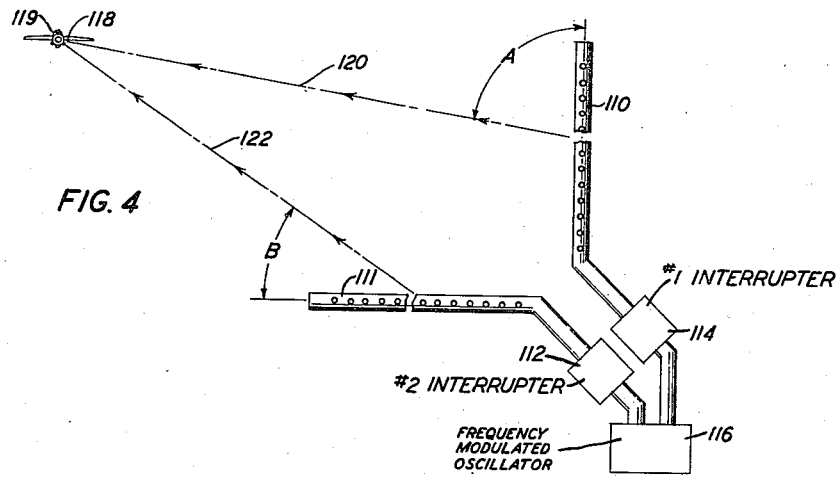
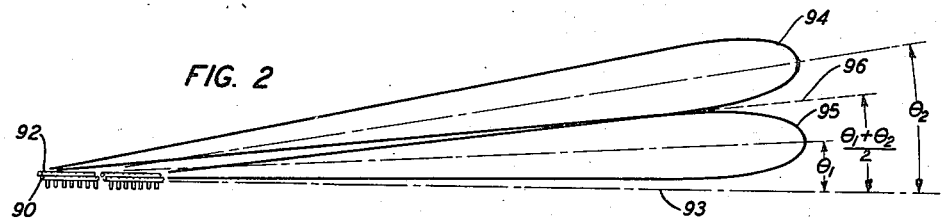
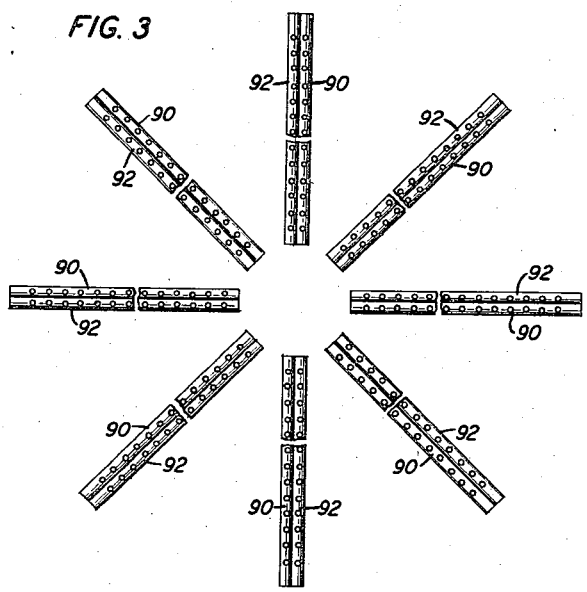
INVENTOR
W. P. MASON
BY
H. O. Wright
ATTORNEY June 24, 1947.  W. P. MASON  2,422,691
PRISMATIC RADIATING NAVIGATIONAL SYSTEM
Original Filed March 1, 1941  3 Sheets-Sheet 3

INVENTOR
W. P. MASON
BY
H. O. Wright
ATTORNEY

Patented June 24, 1947

2,422,691

UNITED STATES PATENT OFFICE 2,422,691

PRISMATIC RADIATING NAVIGATIONAL SYSTEM

Warren P. Mason, West Orange, N. J., assignor to Bell Telephone Laboratories, Incorporated, New York, N. Y., a corporation of New York Original application March 1, 1941, Serial No. 381,236, now Patent No. 2,408,435, dated October 1, 1946. Divided and this application June 22, 1942, Serial No. 447,960

6 Claims. (Cl. 250—11)

This invention relates to improved navigational systems. More particularly, it relates to navigational systems employing prismatic-radiating devices as beacon radiators. In preferred embodiments to be described hereinafter, navigational systems employing prismatic radiators and providing radio course, direction, position, and landing-path indications for aircraft will be illustrated. In addition, a method of advantageously employing the sharply directive minor lobe characteristics of prismatic radiators to obtain bearing indications of unusually high accuracy is disclosed.

This application is a division of my copending application Serial No. 381,236, filed March 1, 1941, entitled "Pipe antennas and prisms," now Patent No. 2,408,435, issued October 1, 1946.

Objects of the invention are to provide improved course, direction and position indicating systems for mobile craft.

Other and further objects will become apparent during the course of the following description and in the appended claims.

As taught in my above-mentioned copending application, prismatic radiators, i. e. energy-radiating devices which will spread a frequency band or spectrum, in radiating it, so that each frequency will be launched with greatest amplitude in a particular direction, the directions differing for each frequency, can be readily constructed of relatively simple pipe-like structures provided with a large number of regularly-spaced orifices, the structure comprising a substantially uniform transmitting medium, a large number of wavelengths in its longitudinal dimension and providing substantially equal phase changes between successive orifices which vary with frequency over the frequency spectrum of interest. Energy is introduced at one end of the structure and small amounts are radiated from each orifice as the energy travels the length of the structure.

Such radiators, applicant has discovered, have the further peculiarity that while, for any given direction, a particular frequency will be transmitted with maximum amplitude, adjacent frequencies will be to some extent transmitted as minor lobes, the minor lobes being more sharply defined than the major lobe and the minimum points of transmission at frequencies between adjacent lobes, particularly between the major lobe and the nearest minor lobes on each side thereof, are very sharply defined and thus lend themselves very effectively for use in determining bearing angles with a high degree of precision.

Prismatic radiators of the invention and combinations of two or more of them can be employed as beacons or navigational aids since a mobile craft can, by determining the frequency characteristics of the energy received from them, obtain indications of the angular direction, with respect to each device from time to time.

The principles of the invention will be more readily perceived in connection with the following description of preferred illustrative embodiments and from the accompanying drawings in which:

Fig. 2 shows two prismatic antennas arranged to radiate a pair of lobes directed at slightly different vertical angles in a common plane to provide an inclined median line of equal energies from the two antennas for use in landing aircraft;

Fig. 3 shows eight pairs of prismatic antennas, arranged radially from a common center, each pair being designed as for the pair of Fig. 2 to provide inclined, guiding median energy lines for aircraft, approaching from any of a plurality of azimuth angles;

Fig. 4 shows a system of the invention employing two prismatic radiators, the longitudinal axes of which are in quadrature relation, the system enabling mobile craft to obtain direction, position, course and landing path indications;

Figure 1:
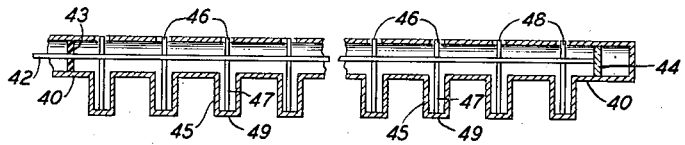
Fig. 1 illustrates a form of prismatic radiator suitable for use in certain beacon or navigational aiding radio systems of the invention.

In more detail in Fig. 1, a concentric line comprising an outer conductor 40, and an inner conductor 42, the axial length of the line being great with respect to the diameter of the outer conductor, is provided at regular intervals along it with concentric line stubs, each stub line comprising an outer conductor 45, an inner conductor 47 and an end member 49 closing the free end of the stub and short-circuiting its inner and outer conductors at that point. The inner-stub conductors 47 are all extended to and conductively joined with the inner conductor 42 of the main concentric line.

The outer conductor 40 of the main line has an orifice therein opposite each of the above-described stub concentric lines, the dimensions of the orifices being small with respect to the diameter of the outer conductor 40.

The inner conductor 42 of the main line has a small conductor 46 projecting normally from it and centrally into each of the above-mentioned orifices, the free end of the small conductor in each instance being substantially flush with the outer surface of conductor 40 and being smaller in cross-sectional area than the orifice and being positioned centrally therein so as to avoid conductive contact with conductor 40.

The purpose of conductors 46 is, as described in my above-mentioned parent application, to decrease the radiation resistance and increase the radiation of energy from the orifice with which it is associated. The far (right) end of inner conductor 42 is connected to outer conductor 40 through a carbon resistance film termination member 44, the resistance of which should substantially match the characteristic impedance of the structure to prevent the reflection of any substantial amount of the energy which may reach that point.

At the left or input end of the main line one or more spacing insulators 43 can be employed to maintain the inner conductor 42 centrally within the outer conductor 40.

Inner conductors 47 of the stub lines will serve also to maintain conductor 42 centrally within conductor 43.

The over-all structure is preferably proportioned to be a coaxial line wave filter in accordance with principles explained in a paper entitled "Filters and transformers using coaxial and balanced transmission lines" by applicant and R. A. Sykes, published in the Bell System Technical Journal for July 1937, illustrated at page 278 thereof.

A theoretical analysis of structures of the type illustrated in Fig. 1 is given in detail in my above-mentioned parent application. The length of the structure should be relatively great, devices commonly employed having from 25 to several hundred orifices therein.

As explained and illustrated in my parent application the directivity of the device increases as its length is increased and its angular directivity for radiation or reception of radio-wave energy is dependent upon the frequency of the energy, each frequency within the pass-band of the wave filter being radiated or received with greatest efficiency at a particular angle with respect to the longitudinal axis of the main coaxial line, the angle differing for each frequency in the pass-band.

Since the device will spread the pass-band frequencies into a spectrum, as above described, it is denoted as a prismatic radiating and receiving device.

In Fig. 2, two radiators 90 and 92 of the type illustrated in detail by Fig. 1 are indicated as being placed with their orifices substantially in a horizontal or "ground" plane 93. Radiator 90 is designed and energized to radiate energy at an angle of $\theta_2$ as indicated by lobe 94 and radiator 92 is designed and energized to radiate energy at an angle of $\theta_1$ as indicated by lobe 95. The median line 96, along which an equal amount of energy from each of the lobes 94 and 95 will be received, can then serve as a landing guide path for aircraft in approaching or leaving the ground plane 93.

Since the radiators 90 and 92 may be placed with the surfaces in which the orifices are provided, substantially flush with the surface of the landing field, they are particularly advantageous for this use as they present no projecting parts which may be damaged or may cause damage to craft on the field. For their further protection they may be encased in concrete; care being taken, of course, not to obstruct normal radiation from the orifices.

The two radiators can preferably operate on a common-carrier frequency, the two beams being distinguished by means of differing modulating frequencies. For general use a guide path inclined at an angle of substantially 2.5 degrees with respect to the landing surface is preferable, so that $\theta_1$ can preferably be zero and $\theta_2$ can then preferably be 5 degrees.

To obtain substantial concentration of the energy in a 2.5 degree beam, pipe radiators approximately 100 feet long having approximately 300 orifices will be suitable with a carrier wave-length in the neighborhood of 10 centimeters. For shorter wave-lengths, shorter structures can be employed and wave-guide structures of the type illustrated in Fig. 18 of my parent application will be found advantageous for use at very short wave-lengths (ultra-high frequencies) in place of concentric line structures.

In Fig. 3, eight pairs of prismatic radiators 90 and 92 of Fig. 2 are shown arranged radially about a common center point to provide landing guide paths for a corresponding number of azimuth angles of approach to the landing surface so that variable factors, such as wind direction and normal-approach angles from several airlanes can be more readily taken into consideration.

In Fig. 4 an aircraft radio-guiding system is shown in which two radiators 110 and 111 which can be preferably of the type illustrated in Fig. 1 are placed in quadrature relation and definitely oriented at a known fixed reference point or beacon station. A frequency-modulated oscillator 116 supplies energy to radiators 110 and 111 through interrupters 114 and 112, respectively. The frequency of oscillator 116 is modulated over the range of frequencies within the pass-bands of radiators 110 and 111 so that the beams emitted by them are swung through arcs of substantially 180 degrees. Interrupters 114 and 112 put further distinctive keying or modulating characteristics on the frequencies furnished their respective radiators so that an aircraft may distinguish energy received from one, from energy received from the other.

Radiators 110 and 111 can be substantially identical or, alternatively, they can operate over different frequency bands, in which case interrupters 112 and 114 can be dispensed with and the radiations from the two radiators can be distinguished by noting the frequnecy band in which they are located. In the latter case oscillator 116 can, of course, sweep through the frequencies of both radiator-frequency bands.

In lieu of sweeping the frequency range, the oscillator may provide the complete range or ranges desired, continuously. A convenient source of a wide range of frequencies is resistance "noise," the desired group or groups of frequencies being selected by filters passing the wanted ranges.

Figure 5:
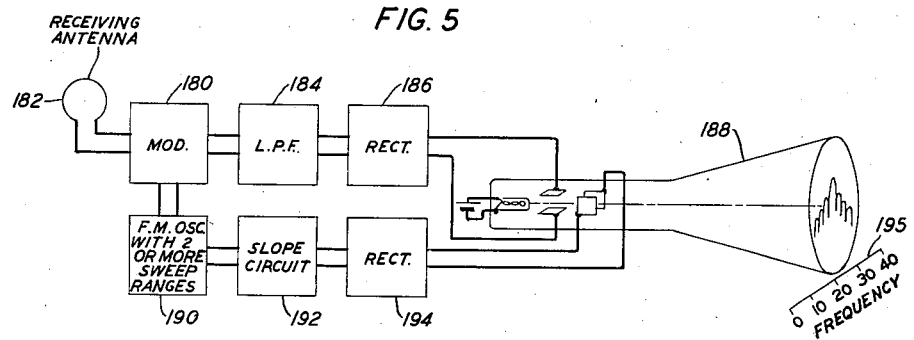
Fig. 5 illustrates in diagrammatic form a particular receiving system which can be used to advantage in direction-indicating systems of the invention, for example systems employing arrangements such as that of Fig. 4.

A craft 118, Fig. 4, equipped with a receiver 119, a preferred form of receiver being illustrated in detail in Fig. 5 to be described hereinunder, can then receive energy wave 120 from radiator 110 and energy wave 122 from radiator 111 and by analyzing the energies received as to their frequency distribution can accurately determine the angles A and B with respect to the two radiators and from this information the navigator of the craft can determine his direction from the beacon station. It should be borne in mind that the distance of the craft from the radiators will, in the majority of cases, be very much greater than the longitudinal dimension of the radiator, and that therefore the relative proportions and spacings shown in Fig. 4 can be only roughly illustrative and in actual use will vary widely, depending upon the particular circumstances.

Numerous other arrangements of the character described above can readily be devised by those skilled in the art. By way of example, radiators 110 and 111 may be positioned at greater distances from the point at which the extensions of their longitudinal axes intersect to afford greater accuracy in position determinations obtained from bearings on them. Again, two or more radiators in other than quadrature relation may obviously be effectively employed.

An aircraft navigator receiving radiations from radiators 110 and 111 arranged as indicated in Fig. 4, can, as above-mentioned, determine his angular relation to each which will determine uniquely his angle with respect to the horizon and his azimuth angle with respect to the two radiators. Combining this with information relative to his altitude from a barometric or radio-type altimeter, he can determine his absolue position at any moment with respect to the surface of the earth and the beacon station.

The system of Fig. 4 can further be employed to obtain direction indicating and glide-path landing beams. When, for example, the aircraft receives equal frequencies from the two radiators, for the case in which radiators 110 and 111 are substantially identical, it is on a path running through the "center" of the beacon station (or point of intersection of the longitudinal axes of the two radiators) at an angle of 45 degrees with respect to each radiator's longitudinal axis. If the frequencies being received are below the mid-band frequency of radiation, the craft will be approaching in the positive direction, i. e., from the upper left of the system as indicated in Fig. 4, whereas if the received frequencies are above the mid-band, it will be approaching in the opposite direction. Along the earth's surface on the 45-degree line assumed, the frequencies will correspond to that required for 45-degree angle radiation from the radiators while if the frequencies correspond to a radiation angle of $x$ given by Equation 1, below, the glide path will be at an angle of $x$ with respect to the ground, as defined in Equation 1 below $$\cos x = \frac{\cos 45°}{\sqrt{1+\sin^2 \theta}} \qquad (1)$$

Figure 8:
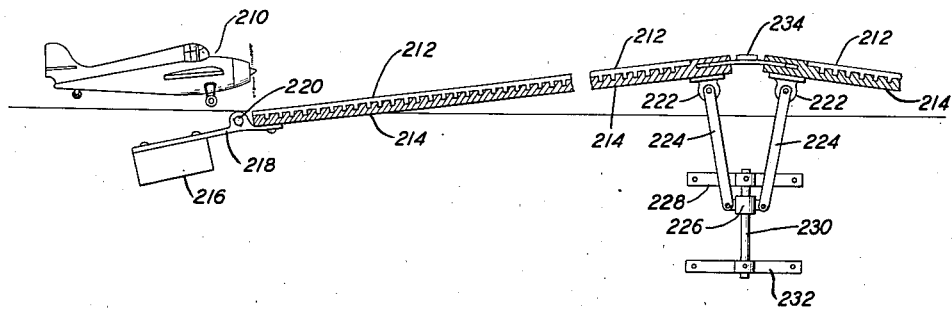
Fig. 8 illustrates the use of a tilting platform with radiators of the invention in a blind landing system for aircraft.

In order to make the system more sensitive to the landing angle $\theta$, the landing radiators can be tipped with respect to the horizontal as indicated in Fig. 8. This can conveniently be done as illustrated in Fig. 8 by mounting the radiators 212 on a tilting platform 214 of light weight which will, preferably, swing down on pivot 220 to a level position in the event that an aircraft 210 should strike it or alight upon it in landing. A guiding mechanism comprising a sliding member 226 on a vertical guide 230, linked to the upper end of the platform 214 by link 224 and pivots on members 226 and 222, or equivalent mechanism is preferably provided. A like arrangement for craft approaching from the opposite direction can also conveniently be provided and may employ the same sliding member 226 and guide 230 so that both platforms assume a horizontal position when an aircraft lands on either. A counterweight 216 suspended on a lever 218 is preferably provided so that a relatively small force will suffice to swing the platform into its horizontal position. Member 234 having lateral projections which slide into the ends of the two platforms 214 can be provided to fill any clearance space between platforms 214 when in their horizontal positions which may be deemed convenient. Members 228 and 232 fixedly support vertical guide 230.

For the reception on a mobile craft of beacon signals from radiators of the invention, it is advantageous as above mentioned to employ the fact that while the maximum lobe radiated at any particular angle is rather broad, the first minima, separating the maximum lobe from adjacent minor, or less strongly radiated, lobes are very narrow for these radiators and can be accurately placed. The frequency spectrum received at a given position can be readily examined, for example, by employing a frequency-modulated heterodyne oscillator and a narrow band filter, the two minima on either side of the principal maximum can be accurately located and the angle or bearing from the radiator can thereby be determined within a small fraction of a degree.

Details of such a receiving system are shown in Fig. 5. It consists of a frequency-modulated oscillator 190 whose frequency range is sufficient to cover the maximum and at least two minima on either side. The control of this oscillator is connected to one pair of deflecting plates of a cathode ray tube 188 through a slope circuit 192 and rectifier 194, so that the spot sweeps across the tube in accordance with the frequency of the oscillator. Oscillator 190 also modulates the output of the antenna 182 in modulator 180 and the resulting modulation is sent through a low-pass filter 184 whose frequency range is smaller than the frequency breadth of the minima of the curve.

The relations of the maxima and minima can be determined from the radiation pattern formula $$\frac{E_\theta}{E_0} = \frac{1}{n} \frac{\sin n \left( \frac{B - \frac{\omega l}{c} \cos \theta}{2} \right)}{\sin \left( \frac{B - \frac{\omega l}{c} \cos \theta}{2} \right)} \qquad (2)$$

where $n$ is the number of radiating orifices, $l$ is the separation between successive adjacent orifices, $c$ is the velocity of radio waves, $\theta$ is the angle with respect to the longitudinal axis of the radiator and B is the electrical phase shift between successive adjacent orifices.

The principal maximum can be determined from the relation $$B - \frac{\omega l}{c} \cos \theta_M = 0 \qquad (3)$$

or $$\cos \theta_M = \frac{B}{\frac{\omega l}{c}} \qquad (4)$$

The first minima on either side of the principal maximum can be determined from the relation $$\frac{n\left(B = \frac{\omega l}{c} \cos \theta\right)}{2} = \pm \pi \quad (5)$$

or $$\cos \theta_M = \frac{B \pm \frac{2\pi}{n}}{\frac{\omega l}{c}} \quad (6)$$

Figure 7:
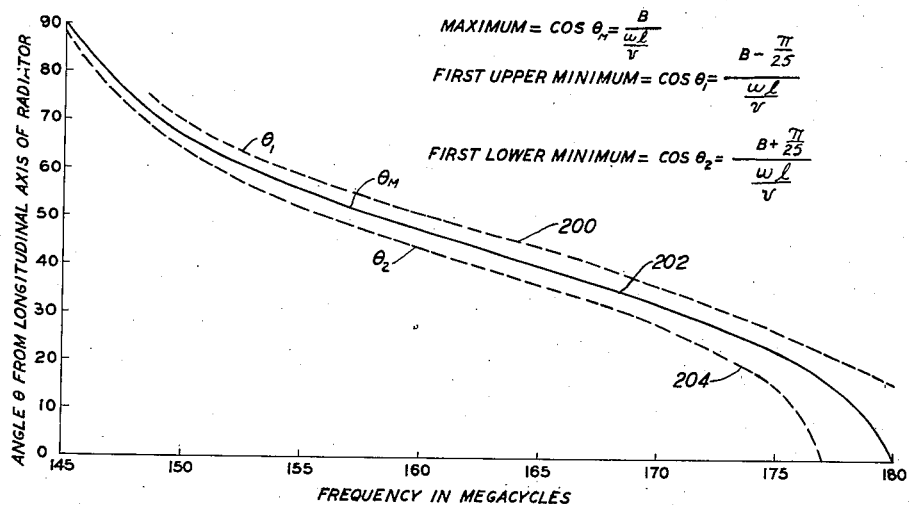
Fig. 7 illustrates the variation of radiation angle $\theta$ with frequency for the principal maximum and the minima immediately adjacent thereto.

The above relations are illustrated in the frequency versus radiation angle curves 200, 202 and 204 of Fig. 7 of the accompanying drawings in which curve 202 relates to the principal maximum, curve 200 relates to the first upper minimum and curve 204 relates to the first lower minimum for a radiator of the type illustrated in Fig. 1, having fifty regularly spaced orifices.

Figure 6:
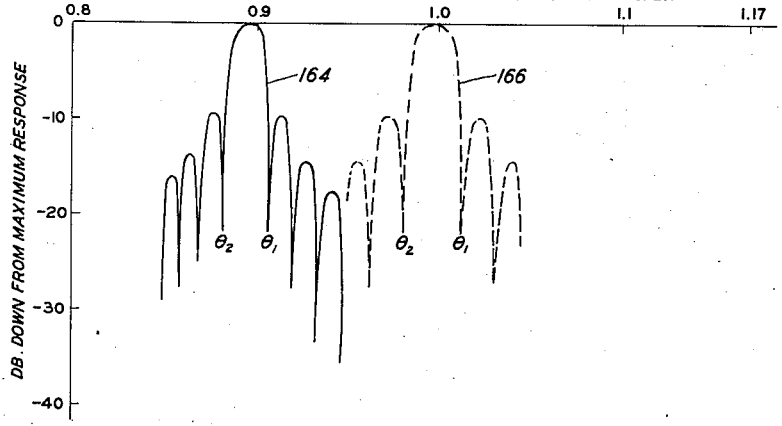
Fig. 6 shows illustrative frequency-amplitude curves for particular radiating angles of prismatic radiators employed in systems of the invention.

The output of filter 184 of Fig. 5 is rectified in rectifier 186 and put on the other pair of deflecting plates of the cathode ray tube. The ray of the tube then will trace a pattern of the frequency versus amplitude curve of the spectrum received. Two such curves for different angles with respect to the longitudinal axis of the radiator are shown in Fig. 6, curve 166 being the pattern received when the position of the receiver is on the extension of the longitudinal axis of the radiator and curve 164 being the pattern received when the position of the receiver is at a substantial angle with respect to the longitudinal axis of the radiator. By varying the range of the frequency-modulated oscillator 190, the accuracy of the frequency determination can be varied. Preferably a wide range is used in locating the maximum and then the range is narrowed and displayed in greater detail on the oscilloscope to more accurately locate the two minima immediately adjacent to the maximum lobe. Appropriate frequency scales for the several ranges to be employed can be provided adjacent to the oscilloscope target, a sample scale 195 with arbitrary units 0 to 40 inclusive being shown in Fig. 5. By following either of the minima $\theta_1$ or $\theta_2$, as a function of frequency as shown in Fig. 7, the angle of radiation with respect to the longitudinal axis of the radiator can be very accurately located, since as shown in Fig. 6 these minima are very sharp.

Increasing the number of wave-lengths in the over-all length of the radiator will cut down the frequency separation between the two minima in proportion to the number of wave-lengths. However, it appears unnecessary to go to a radiator larger than twenty-five wave-lengths for this purpose since by using the minima as explained above the angle can be located with great accuracy. In fact, a radiator shorter than twenty-five wave-lengths can be used and hence it appears entirely feasible to use such a system with wave-lengths at least as long as fifty centimeters. The dash curve 166 of Fig. 6 shows that when the angle between the longitudinal axis of the radiator and the line of direction of the signal becomes small the accuracy of location also becomes smaller.

Numerous other arrangements embodying the principles of the invention may readily be devised, in the light of the above disclosure, by those skilled in the art. For example, sonic or compressional wave systems analogous to the radio systems described may be readily constructed and systems similar to that of Fig. 4 of the accompanying drawing employing more than two radiators to provide additional bearing angles can also be readily constructed without departing from the spirit and scope of the invention. The scope of the invention is defined in the following claims.

What is claimed is:

1. In a radio directional system, a prismatic antenna located at a known reference point and having a fixed known orientation, said antenna including a pipe-like structure with a row of small orifices regularly spaced therealong, the pipe-like structure, the orifices and the interorifice spacing of which are proportioned to pass a predetermined band of frequencies, and to radiate energy of each frequency of said band most strongly at a different angle with respect to the longitudinal axis of said antenna, means for energizing said antenna at frequencies over said predetermined band, means on a mobile object remote from said antenna for receiving energy radiations therefrom, and means for analyzing and observing the frequencies and the relative amplitudes thereof, of the energy so received to obtain an indication of the direction of said mobile object from the reference point.

2. In a radio directional system, a pair of prismatic antennas located at a known reference point and having a fixed known orientation with respect to each other and the cardinal points of the compass, said antennas each including a pipe-like structure with a row of small orifices regularly spaced therealong, the pipe-like structure, the orifices and the interorifice spacing of which are proportioned to pass predetermined bands of frequencies, means for severally energizing said antennas at frequencies over said predetermined bands of frequencies, respectively, means on a mobile object distant from said antennas for receiving energy radiations from both of said antennas and analyzing the respective frequencies of the energies received and the relative amplitudes thereof, to obtain indications of the direction and distance of said object from the said reference point.

3. A radio system for guiding aircraft in approaching a landing surface comprising a pair of parallel prismatic antennas and a source of energy connecting to each antenna, each antenna including a pipe-like structure with a row of small orifices regularly spaced therealong, the pipe-like structure, the orifices and the interorifice spacing of one of said antennas being proportioned and said antenna being energized to transmit a beam substantially parallel to and along the landing surface, the pipe-like structure, the orifices and the interorifice spacing of the other of said antennas being proportioned and said other antenna being energized to transmit a beam at a small positive vertical angle with respect to said landing surface, whereby a craft may follow the median or equal energy line between said two beams and thus approach the landing surface at a known predetermined angle.

4. In a radio directional system, a prismatic wave-filter radiating beacon antenna of the type comprising a pipe-like structure with a row of small orifices regularly spaced therealong, the pipe-like structure, the orifices and the interorifice spacing of which are proportioned to prismatically radiate the spectrum of frequencies within the pass band of said antenna structure, said antenna being definitely oriented at a fixed reference point, means for energizing said antenna with a band of frequencies within the pass band thereof, receiving means on a mobile object, said receiving means including frequency analyzing means and indicating means portraying the results obtained by said frequency analyzing means whereby the characteristics of the received frequency spectrum which most readily lend themselves to precise bearing determinations may be readily employed to advantage.

5. The system of claim 3, the pair of prismatic antennas being normally inclined at a small angle with respect to the horizontal plane of the landing field, the antennas being supported on a counterbalanced platform arranged to assume a horizontal position should an aircraft strike or land upon the platform.

6. In a radio direction indicating system, a pair of prismatic antennas definitely positioned and oriented at a known reference point, each of said antennas comprising a pipe-like structure with a row of small orifices regularly spaced along it, the pipe-like structure, the orifices and the interorifice spacing being proportioned to impart specific directive properties to the energy radiated by the antenna the directive properties being a function of the frequency of the energy, an energy source connected to each antenna, the energy sources providing the frequencies necessary to cause the antennas to radiate in the desired directions, and receiving and frequency analyzing means on a mobile craft whereby the direction of the reference point from the mobile craft can be determined.

WARREN P. MASON.

REFERENCES CITED

The following references are of record in the file of this patent:

UNITED STATES PATENTS

| Number | Name | Date |
| --- | --- | --- |
| 2,014,732 | Hansell | Sept. 17, 1935 |
| 2,273,914 | Wallace | Feb. 24, 1942 |